United States Patent
Kremer et al.

(10) Patent No.: US 11,573,297 B2
(45) Date of Patent: Feb. 7, 2023

(54) LIDAR SYSTEM WITH INTEGRATED CIRCULATOR

(71) Applicant: GM GLOBAL TECHNOLOGY OPERATIONS LLC, Detroit, MI (US)

(72) Inventors: Richard Kremer, Calabasas, CA (US); Timothy J. Talty, Beverly Hills, MI (US); Pamela R. Patterson, Los Angeles, CA (US); Biqin Huang, Torrance, CA (US); Michael Mulqueen, Malibu, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 750 days.

(21) Appl. No.: 16/554,858

(22) Filed: Aug. 29, 2019

(65) Prior Publication Data

US 2020/0088848 A1 Mar. 19, 2020

Related U.S. Application Data

(60) Provisional application No. 62/731,455, filed on Sep. 14, 2018.

(51) Int. Cl.
| | | |
|---|---|---|
| *G01S 7/481* | (2006.01) | |
| *G05D 1/02* | (2020.01) | |
| *G01S 17/08* | (2006.01) | |
| *G01S 17/931* | (2020.01) | |
| *G02B 6/12* | (2006.01) | |

(Continued)

(52) U.S. Cl.
CPC ............ *G01S 7/4817* (2013.01); *G01S 17/04* (2020.01); *G01S 17/08* (2013.01); *G01S 17/66* (2013.01); *G01S 17/87* (2013.01); *G01S 17/88* (2013.01); *G01S 17/931* (2020.01); *G02B 6/12* (2013.01); *G05D 1/0238* (2013.01)

(58) Field of Classification Search
CPC ...... G01S 7/4817; G01S 17/931; G01S 17/04; G01S 17/08; G01S 17/66; G01S 17/87; G01S 17/88; G02B 6/12; G05D 1/0238
See application file for complete search history.

(56) References Cited

U.S. PATENT DOCUMENTS

| | | | |
|---|---|---|---|
| 9,683,928 B2 * | 6/2017 | Swanson | G02B 6/02042 |
| 10,741,910 B2 * | 8/2020 | Swanson | G01S 7/4817 |

(Continued)

FOREIGN PATENT DOCUMENTS

EP 3081956 A1 10/2016

*Primary Examiner* — Peter M Bythrow
(74) *Attorney, Agent, or Firm* — Cantor Colburn LLP

(57) ABSTRACT

A vehicle, Lidar system and method of detecting an object is disclosed. The Lidar system includes a photonic chip having an aperture, one or more photodetectors and a circulator. A transmitted light beam generated within the photonic chip exits the photonic chip via the aperture and a reflected light beam enters the photonic chip via the aperture, the reflected light beam being a reflection of the transmitted light beam from the object. The one or more photodetectors measure the parameter of the object from at least the reflected light beam. The circulator integrated into the photonic chip directs the transmitted light beam toward the aperture and directs the reflected light beam from the aperture to the one or more photodetectors. A navigation system navigates the vehicle with respect to the object based on the parameter of the object.

20 Claims, 8 Drawing Sheets

(51) Int. Cl.
*G01S 17/88* (2006.01)
*G01S 17/04* (2020.01)
*G01S 17/66* (2006.01)
*G01S 17/87* (2020.01)

(56) References Cited

U.S. PATENT DOCUMENTS

| | | | |
|---|---|---|---|
| 11,105,900 B2* | 8/2021 | Sayyah | G02B 26/0833 |
| 11,162,789 B2* | 11/2021 | Lodin | G01S 17/42 |
| 2013/0083389 A1* | 4/2013 | Dakin | G01S 17/58 |
| | | | 359/341.1 |
| 2014/0376001 A1* | 12/2014 | Swanson | G01N 21/17 |
| | | | 356/479 |
| 2015/0185246 A1* | 7/2015 | Dakin | G01S 7/4812 |
| | | | 356/28 |
| 2015/0382089 A1* | 12/2015 | Mazed | H04Q 11/0005 |
| | | | 398/47 |
| 2016/0274025 A1 | 9/2016 | Skibo et al. | |
| 2017/0153319 A1* | 6/2017 | Villeneuve | H01S 3/08086 |
| 2017/0299697 A1* | 10/2017 | Swanson | G01S 7/4817 |
| 2019/0049312 A1* | 2/2019 | Strandjord | G01J 9/0246 |
| 2019/0271821 A1* | 9/2019 | Moebius | G01S 7/4816 |
| 2019/0310372 A1* | 10/2019 | Crouch | G01S 17/26 |
| 2019/0343377 A1* | 11/2019 | Fan | G01B 11/2441 |
| 2019/0346568 A1* | 11/2019 | Feng | G01S 7/4818 |
| 2020/0025926 A1* | 1/2020 | Asghari | G01S 7/4813 |
| 2020/0182978 A1* | 6/2020 | Maleki | G01S 17/58 |

* cited by examiner

LIDAR SYSTEM WITH INTEGRATED CIRCULATOR

CROSS REFERENCE TO RELATED APPLICATION

This application claims the benefit of U.S. Provisional Application Ser. No. 62/731,455 filed Sep. 14, 2018, the contents of which are incorporated by reference herein in its entirety.

INTRODUCTION

The subject disclosure relates to Lidar systems and, in particular to a system and method for transmitting and receiving light beams for use in Lidar systems.

A vehicle can use a Lidar system in order to locate and determine parameters of objects in a field of view of the vehicle. The Lidar system transmits a beam of light from a first location and receives, at a second location, a reflection of the transmitted light beam from the objects. The use of a first location for beam transmission and a second location for receiving a reflected beam requires the use of free space optics to direct the beams appropriately. Alignment issues between the free space optics and the first and second location can degrade the effectiveness of the Lidar system. Accordingly, it is desirable to provide a system for beam transmission and beam reception that avoids these alignment issues.

SUMMARY

In one exemplary embodiment, a method of detecting an object is disclosed. The method includes directing a transmitted light beam generated within the laser to an aperture of the photonic chip via a circulator of the photonic chip, receiving a reflected light beam at the aperture, the reflected light beam being a reflection of the transmitted light beam from the object, directing the reflected light beam to one or more photodetectors via the circulator, and detecting a parameter of the object from the reflected light beam at the one or more photodetectors.

In addition to one or more of the features described herein, the method further includes generating the transmitted light beam via a laser of a photonic chip. The method further includes passing the transmitted light beam and the reflected light beam through a single lens in free space. The method further includes directing the transmitted light beam from the aperture towards a selected direction via a microelectromechanical (MEMS) scanner and directing the reflected light beam received from the selected direction toward the aperture. The method further includes obtaining a local oscillator beam from the transmitted beam via a splitter between the laser and the circulator. The method further includes combining the local oscillator beam with the reflected light beam at a location between the circulator and the one or more photodetectors. The method further includes navigating a vehicle with respect to the object based on the parameter of the object.

In another exemplary embodiment, a Lidar system is disclosed. The Lidar system includes a photonic chip that measures a parameter of an object. The photonic chip includes an aperture by which a transmitted light beam generated within the photonic chip exits the photonic chip and by which a reflected light beam enters the photonic chip, the reflected light beam being a reflection of the transmitted light beam from the object. The photonic chip also includes one or more photodetectors configured to measure the parameter of object form at least the reflected light beam, and a circulator integrated into the photonic chip to direct the transmitted light beam toward the aperture and to direct the reflected light beam from the aperture to the one or more photodetectors.

In addition to one or more of the features described herein, a laser is integrated into the photonic chip, the laser generating the transmitted light beam. The Lidar system further includes a single lens in free space located in front of the aperture through which the transmitted light beam and the reflected light beam pass. The Lidar system further includes a microelectromechanical (MEMS) scanner that directs the transmitted light beam from the aperture towards a selected direction via and directs the reflected light beam received from the selected direction toward the aperture. A splitter of the photonic chip between the laser and the circulator obtains a local oscillator beam from the transmitted beam. A combiner of the photonic chip between the circulator and the one or more photodetectors combines the local oscillator beam with the reflected light beam. In an embodiment in which the Lidar system is associated with a vehicle, a navigation system navigates the vehicle with respect to the object based on the parameter of the object.

In yet another exemplary embodiment, a vehicle is disclosed. The vehicle includes a Lidar system and a navigation system. The Lidar system measures a parameter of an object. The Lidar system includes a photonic chip having an aperture, one or more photodetectors and a circulator. A transmitted light beam generated within the photonic chip exits the photonic chip via the aperture and a reflected light beam enters the photonic chip via the aperture, the reflected light beam being a reflection of the transmitted light beam from the object. The one or more photodetectors measure the parameter of the object from at least the reflected light beam. The circulator is integrated into the photonic chip, directs the transmitted light beam toward the aperture and directs the reflected light beam from the aperture to the one or more photodetectors. The navigation system navigates the vehicle with respect to the object based on the parameter of the object.

In addition to one or more of the features described herein, the Lidar system further includes a laser integrated into the photonic chip, the laser generating the transmitted light beam. The Lidar system further includes a single lens in free space in front of the aperture and through which the transmitted light beam and the reflected light beam pass. The Lidar system further includes a microelectromechanical (MEMS) scanner configured to direct the transmitted light beam from the aperture towards a selected direction via and direct the reflected light beam received from the selected direction toward the aperture. The photonic chip further includes a splitter between the laser and the circulator for obtaining a local oscillator beam from the transmitted light beam. The photonic chip further includes a combiner between the circulator and the one or more photodetectors for combining the local oscillator beam with the reflected light beam.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
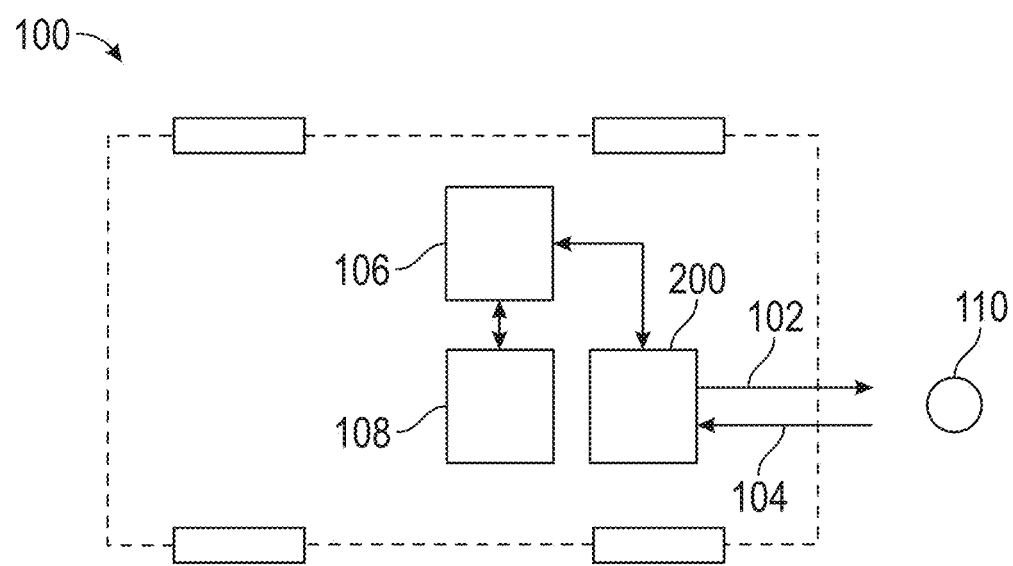
FIG. 1 shows a plan view of a vehicle suitable for use with a Lidar system.

The following description is merely exemplary in nature and is not intended to limit the present disclosure, its application or uses. It should be understood that throughout the drawings, corresponding reference numerals indicate like or corresponding parts and features.

Figure 2:
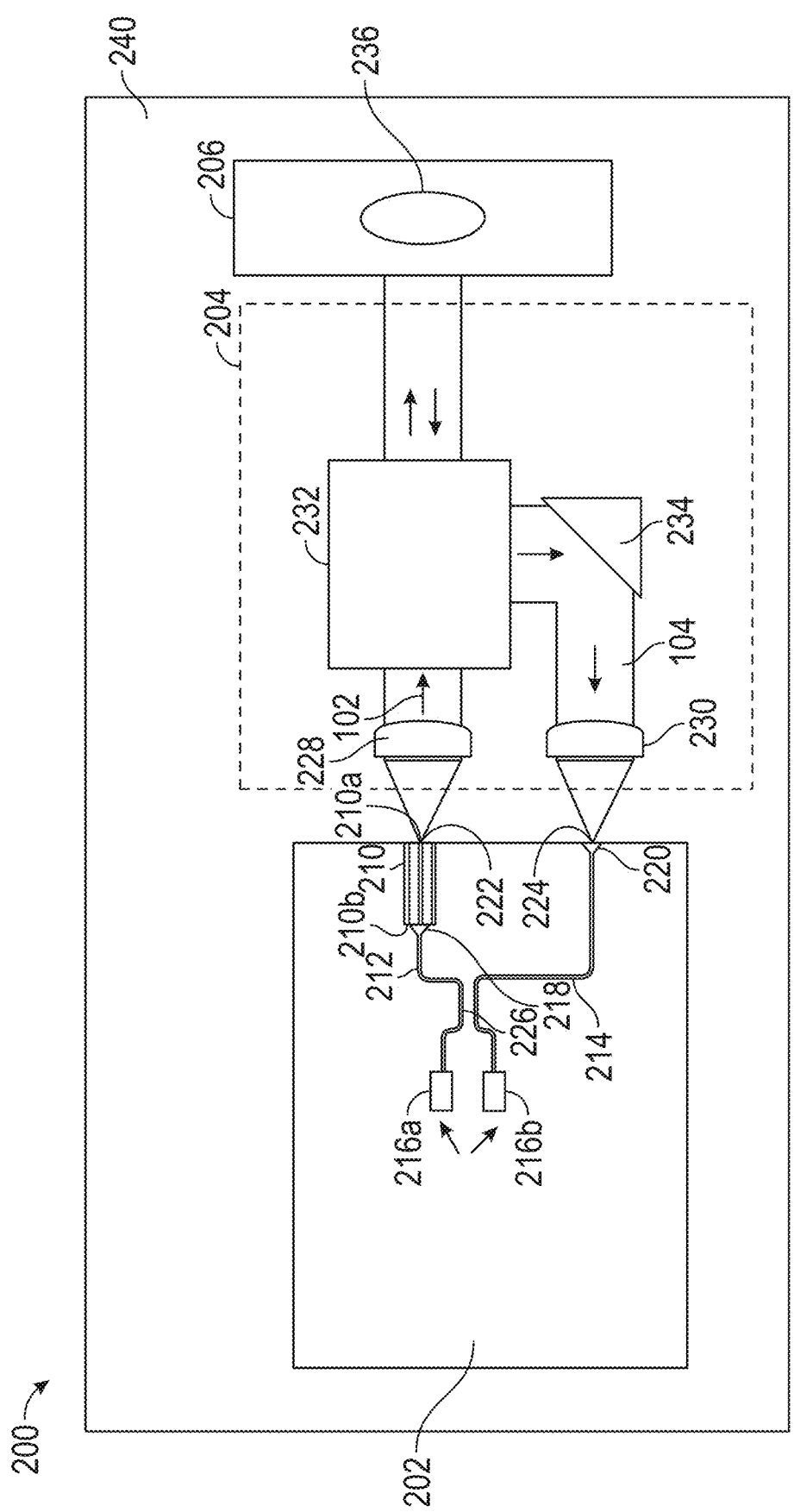
FIG. 2 shows a detailed illustration of an exemplary Lidar system suitable for use with the vehicle of FIG. 1.

In accordance with an exemplary embodiment, FIG. 1 shows a plan view of a vehicle 100 suitable for use with a Lidar system 200 of FIG. 2. The Lidar system 200 generates a transmitted light beam 102 that is transmitted toward an object 110. The object 110 can be any object external to the vehicle 100, such as another vehicle, a pedestrian, a telephone pole, etc. Reflected light beam 104, which is due to interaction of the object 110 and the transmitted light beam 102, is received back at the Lidar system 200. A processor 106 controls various operation of the Lidar system 200 such as controlling a light source of the Lidar system 200, etc. The processor 106 further receives data from the Lidar system 200 related to the differences between the transmitted light beam 102 and the reflected light beam 104 and determines various parameters of the object 110 from this data. The various parameters can include a distance or range of the object 110, azimuth location, elevation, Doppler (velocity) of the object, etc. The vehicle 100 nay further include a navigation system 108 that uses these parameters to navigate the vehicle 100 with respect to the object 110 for the purposes of avoiding contact with the object 110. While discussed with respect to vehicle 100, the Lidar system 200 can be used with other devices in various embodiments, including chassis control systems and forward or pre-conditioning vehicle for rough roads.

FIG. 2 shows a detailed illustration of an exemplary Lidar system 200 suitable for use with the vehicle of FIG. 1. The Lidar system 200 includes an integration platform 240, which can be a Silicon platform, and various affixed components. A photonic chip 202, free space optics 204 and a microelectromechanical (MEMS) scanner 206 are disposed on the integration platform 240.

In various embodiments, the photonic chip 202 is part of a scanning frequency modulated continuous wave (FMCW) Lidar. The photonic chip 202 can be a silicon photonic chip in various embodiments. The photonic chip 202 can include a light source, a waveguide and at least one photodetector. In one embodiment, the photonic chip 202 includes a light source, such as a laser 210, a first waveguide 212 (also referred to herein as a local oscillator waveguide), a second waveguide 214 (also referred to herein as a return signal waveguide) and a set of photodetectors 216a and 216b. The photonic chip 202 further includes one or more edge couplers 218, 220 for controlling input of light into associated waveguides. The edge couplers can be spot size converters, gratings or any other suitable device for transitioning light between free space propagation and propagation within a waveguide. At a selected location, the first waveguide 212 and the second waveguide 214 approach each other to form a multi-mode interference (MMI) coupler 226.

The laser 210 is an integrated component of the photonic chip 202. The laser 210 can be any single frequency laser that can be frequency modulated and can generate light at a selected wavelength such as a wavelength that is considered safe to human eyes (e.g., 1550 nanometers (nm)). The laser 210 includes a front facet 210a and a back facet 210b. A majority of the energy from the laser 210 is transmitted into free space via the front facet 210a and a first aperture 222 (transmission aperture) of the photonic chip 202. A relatively small percentage of energy from the laser, also referred to as leakage energy, exits the laser 210 via the back facet 210b and is directed into the first waveguide 212.

The leakage energy used as the local oscillator beam can be varying, therefore affecting measurements related to the parameter of the object 110. In order to control power of the local oscillator beam, a variable attenuator can be used in the optical path of the local oscillator waveguide. When the power of the local oscillator beam exceeds a selected power threshold, the attenuator can be activated to limit the power local oscillator beam. Alternatively, a control voltage can be used at the laser 210 in order to control the gain of the laser 210 at the back facet 210b of the laser. The control voltage can be used to either increase or decrease the radiation or leakage energy at the back facet 210b.

The first waveguide 212 provides an optical path between the back facet 210b of laser 210 and the photodetectors 216a, 216b. An end of the first waveguide 212 is coupled to the back facet 210b of the laser 210 via first edge coupler 218. Leakage energy from the back facet 210b is directed into the first waveguide 212 via the first edge coupler 218.

The second waveguide 214 provides an optical path between a second aperture 224, also referred to as a receiver aperture, of the photonic chip 202 and the photodetectors 216a, 216b. The second edge coupler 220 at the second aperture 224 focuses the incoming reflected light beam 104 into the second waveguide 214.

The first waveguide 212 and second waveguide 214 form a multimode interference (MMI) coupler 226 at a location between their respective apertures (222, 224) and the photodetectors (216a, 216b). Light in the first waveguide 212 and light in the second waveguide 214 interfere with each other at the MMI coupler 226 and the results of the interference are detected at photodetectors 216a and 216b. Measurements at the photodetectors 216a and 216b are provided to the processor 106, FIG. 1, which determines various characteristics of the reflected light beam 104 and thus various parameters of the object 110, FIG. 1. The photodetectors 216a and 216b convert the light signal (i.e., photons) to an electrical signal (i.e., electrons). The electrical signal generally requires additional signal processing such as amplification, conversion from an electrical current signal to an electrical voltage signal, and conversion from an analog signal into a discrete digital signal prior to be provided to the processor 106.

The free space optics 204 includes a collimating lens 228 a focusing lens 230, an optical circulator 232 and a turning mirror 234. The collimating lens 228 changes the curvature of the transmitted light beam 102 from a divergent beam (upon exiting the front facet 210*a* of laser 210*b* to a collimated or parallel light beam. The optical circulator 232 controls a direction of the transmitted light beam 102 and of the reflected light beam 104. The optical circulator 232 directs the transmitted light beam 102 forward without any angular deviation and directs the incoming or reflected light beam 104 by a selected angle. In various embodiments, the selected angle is a 90 degree angle, but any suitable angle can be achieved. The reflected light beam 104 is directed toward the focusing lens 230 at turning mirror 234. The focusing lens 230 changes the curves of the reflected light beam 104 from a substantially parallel light beam to a converging light beam. The focusing lens 230 is placed at a distance from second aperture 224 that allows concentration of the reflected light beam 104 onto the second edge coupler 220 at the second aperture 224.

The MEMS scanner 206 includes a mirror 236 for scanning the transmitted light beam 102 over a plurality of angles. In various embodiments, the mirror 236 is able to rotate along two axes, thereby scanning the transmitted light beam 102 over a selected area. In various embodiments, the mirror axes include a fast axis having a scan angle of about 50 degrees and a quasi-static slow axis having a scan angle of about 20 degrees. The MEMS scanner 206 can direct the transmitted light beam in a selected direction and receives a reflected light beam 104 from the selected direction.

Figure 3:
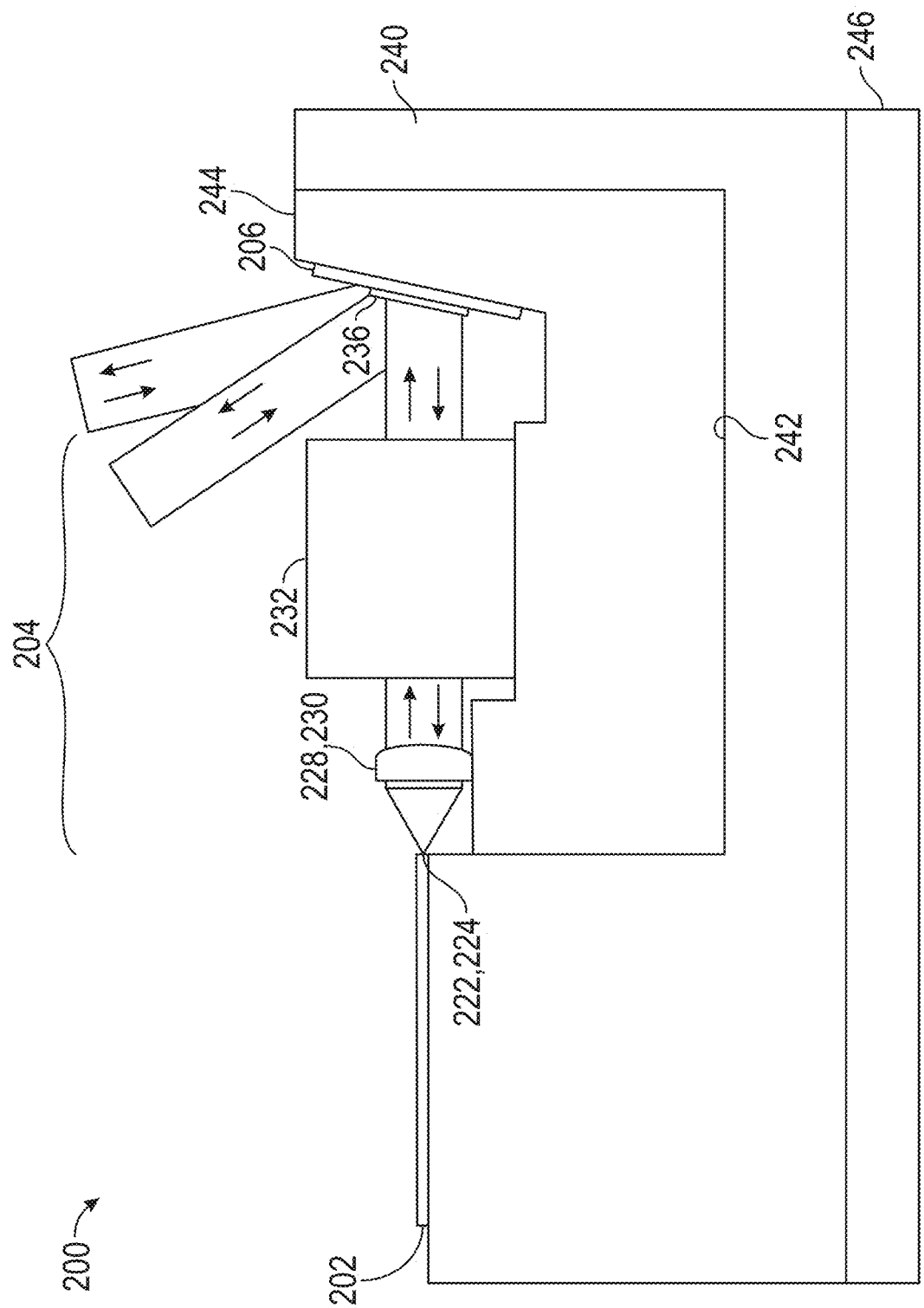
FIG. 3 shows a side view of the Lidar system of FIG. 2.

FIG. 3 shows a side view of the Lidar system 200 of FIG. 2. The integration platform 240 includes the photonic chip 202 disposed on a surface of the integration platform 240. The integration platform 240 includes a pocket 242 into which an optical submount 244 can be disposed. The free space optics 204 and the MEMS scanner 206 can be mounted on the optical submount 244 and the optical submount can be aligned within pocket 242 in order to align the collimating lens 228 with the first aperture 222 of the photonic chip 202 and align the focusing lens 230 with the second aperture 224 of the photonic chip. The optical submount 244 can be made of a material that has a coefficient of thermal expansion that matches or substantially matches the coefficient of thermal expansion of the integration platform 240, in order to maintain the alignment between the free space optics 204 and the photonic chip 202. The integration platform 240 can be coupled to a printed circuit board 246. The printed circuit board 246 includes various electronics for operation of the components of the Lidar system 200, including controlling operation of the laser 210, FIG. 2 of the photonic chip 202, controlling oscillations of the mirror 236, receiving signals from the photodetectors 216*a* and 216*b* and processing the signals in order to determine various characteristics of the reflected light beam 104 and thereby determine various parameters of object 110, FIG. 1 associated with the reflected light beam.

The use of an optical submount 244 is one possible implementation for an embodiment of the integration platform 240. In another embodiment, an optical submount 244 is not used and the free space optics 204 and MEMS mirror 236 are disposed directly on the integration platform 240.

Figure 4:
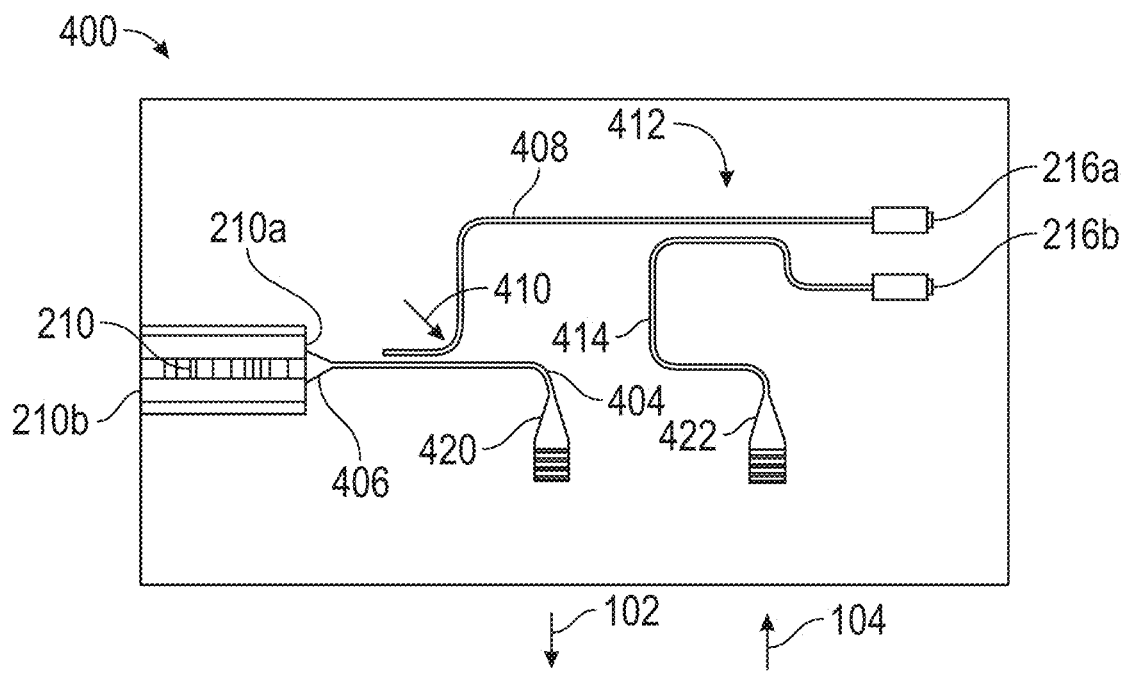
FIG. 4 shows an alternative photonic chip that can be used with the Lidar system in place of the photonic chip of FIG. 2.

FIG. 4 shows an alternative photonic chip 400 that can be used with the Lidar system 200 in place of the photonic chip 202 of FIG. 2. In various embodiments, the photonic chip 400 is part of a scanning frequency modulated continuous wave (FMCW) Lidar and can be a silicon photonic chip. The photonic chip 400 includes a coherent light source such as a laser 210 that is an integrated component of the photonic chip 400. The laser 210 can be any single frequency laser that can be frequency modulated. In various embodiments, the laser 210 generates light at a selected wavelength, such as a wavelength considered safe to human eyes (e.g., 1550 nanometers (nm)). The laser includes a front facet 210*a* out of which a majority of the laser energy exits from the laser 210 and a back facet 210*b* out of which a leakage energy exits. The energy which leaks out the back facet 210*b* can be coupled to a photodetector (not shown) for the purposes of monitoring the performance of the laser 210. The front facet 210*a* of laser 210 is coupled to a transmitter waveguide 404 via a laser-faced edge coupler 406 that receives the light from the laser 210. The transmitter waveguide 404 directs the light from the front facet 210*a* of laser 210 out of the photonic chip 400 via a transmission edge coupler 420 as transmitted light beam 102.

A local oscillator (LO) waveguide 408 is optically coupled to the transmitter waveguide 404 via a directional coupler/splitter or a multi-mode interference (MMI) coupler/splitter 410 located between the laser 210 and the transmission edge coupler 420. The directional or MMI coupler/splitter 410 splits the light from the laser 210 into the transmitted light beam 102 that continues to propagate in the transmitter waveguide 404 and a local oscillator beam that propagates in the local oscillator waveguide 408. In various embodiments, a splitting ratio can be 90% for the transmitted light beam 102 and 10% for the local oscillator beam. The power of a local oscillator beam in the local oscillator waveguide 408 can be controlled by use of a variable attenuator in the LO waveguide 408 or by use of a control voltage at the laser 210. The local oscillator beam is directed toward dual-balanced photodetectors 216*a*, 216*b* that perform beam measurements and convert the light signals to electrical signals for processing.

Incoming or reflected light beam 104 enters the photonic chip 400 via receiver waveguide 414 via a receiver edge coupler 422. The receiver waveguide 414 directs the reflected light beam 104 from the receiver edge coupler 422 towards the dual-balanced photodetector 216*a*, 216*b*. The receiver waveguide 414 is optically coupled to the local oscillator waveguide 408 at a directional or MMI coupler/combiner 412 located between the receiver edge coupler 422 and the photodetectors 216*a*, 216*b*. The local oscillator beam and the reflected light beam 104 interact with each other at the directional or MMI coupler/combiner 412 before being received at the dual-balanced photodetector 216*a*, 216*b*. In various embodiments, the transmitter waveguide 404, local oscillator waveguide 408 and receiver waveguide 414 are optical fibers.

Figure 5:
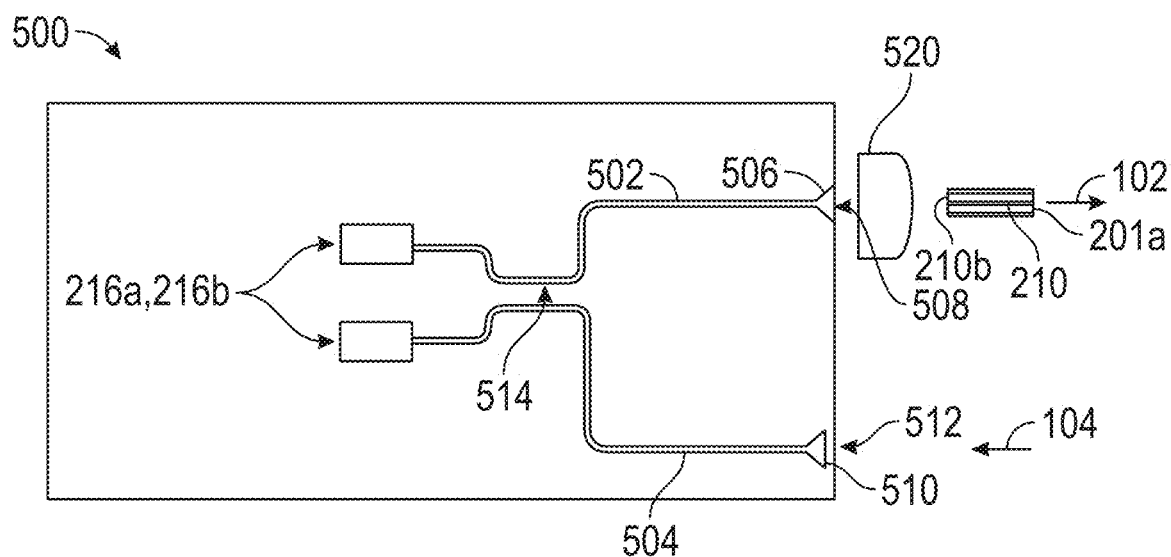
FIG. 5 shows another alternative photonic chip that can be used in place of the photonic chip of FIG. 2.

FIG. 5 shows another alternative photonic chip 500 that can be used in place of the photonic chip 202 of FIG. 2. The alternative photonic chip 500 has a design in which the laser 210 is not integrated onto the photonic chip 500. The photonic chip 500 includes a first waveguide 502 for propagation of a local oscillator beam within the photonic chip 500 and a second waveguide 504 for propagation of a reflected light beam 104 within the photonic chip 500. One end of the first waveguide 502 is coupled to a first edge coupler 506 located at a first aperture 508 of the photonic chip 500 and the first waveguide 502 directs the signal towards photodetectors 216a and 216b. One end of the second waveguide 504 is coupled to a second edge coupler 510 located at a second aperture 512 and the second waveguide 504 directs the signal towards photodetectors 216a, 216b. The first waveguide 502 and the second waveguide 504 approach each other at a location between their respective edge couplers 506, 510 and the photodetectors 216a, 216b to form an MMI coupler 514 in which the local oscillator beam and the reflected light beam 104 interfere with each other.

The laser 210 is off-chip (i.e., not integrated into the photonic chip 500) and is oriented with its back facet 210b directed towards the first edge coupler 506. The laser 210 can be any single frequency laser that can be frequency modulated. In various embodiments, the laser 210 generates light at a selected wavelength, such as a wavelength considered safe to human eyes (e.g., 1550 nanometers (nm)). A focusing lens 520 is disposed between the back facet 210b and the first aperture 508 and focuses the leakage beam from the back facet 210b onto the first edge coupler 506 so that the leakage beam enters the first waveguide 502 to serve as the local oscillator beam. The power of a local oscillator beam in the first waveguide 502 can be controlled by use of a variable attenuator in the first waveguide 502 or by use of a control voltage at the laser 210. Light exiting the laser 210 via the front facet 210a is used as the transmitted light beam 102 and is directed over a field of view of free space in order to be reflected off of an object 110, FIG. 1 within the field of view. The reflected light beam 104 is received at the second edge coupler 510 via suitable free space optics (not shown).

Figure 6:
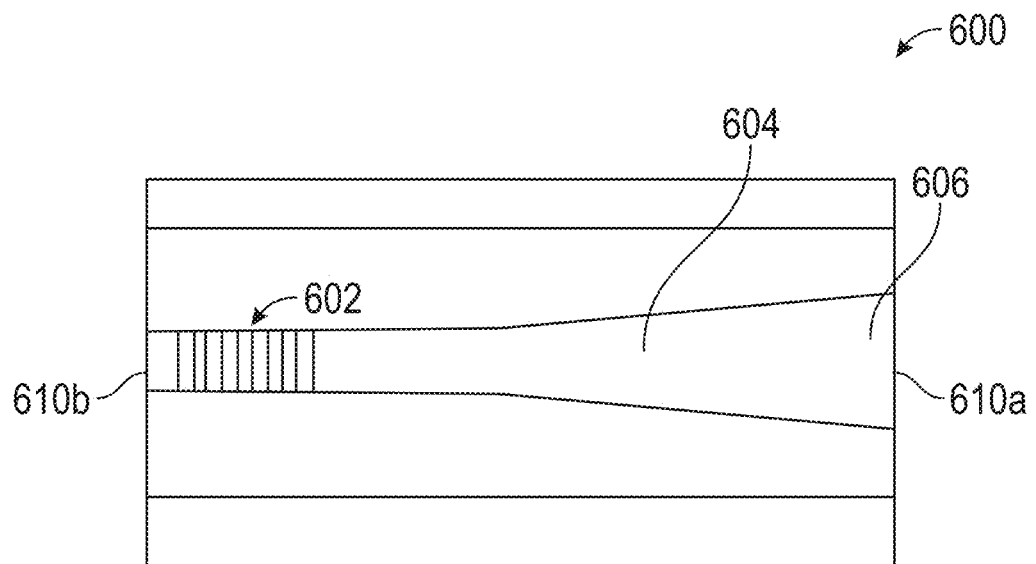
FIG. 6 shows a tapered Distributed Bragg Reflection (DBR) Laser Diode.

FIG. 6 shows a tapered Distributed Bragg Reflection (DBR) Laser Diode 600. The DBR Laser Diode 600 can be used as the laser 210 for the photonic chips 202, 400 and 500 of the Lidar system 200. The DBR Laser Diode 600 includes a highly reflective DBR back mirror 602 at a back facet 610b of the DBR Laser Diode, a less reflective front mirror 606 at a front facet 610a of the DBR Laser Diode and a tapered gain section 604 between the DBR back mirror 602 and the front mirror 606. The DBR back mirror 602 includes alternating regions of materials with different indices of refraction. Current or energy can be applied at the tapered gain section 604 to generate light at a selected wavelength.

Figure 7:
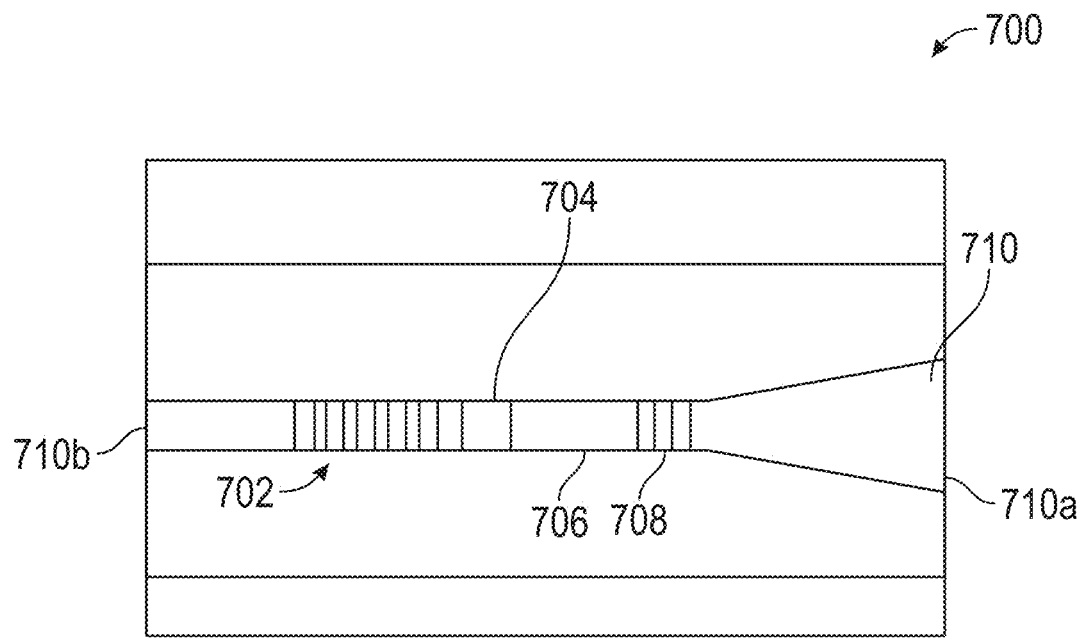
FIG. 7 shows details of a Master Oscillator Power Amplifier (MOPA) in an embodiment.

FIG. 7 shows details of a Master Oscillator Power Amplifier (MOPA) 700 in an embodiment. The MOPA 700 can be used as the laser 210 for the photonic chips 202, 400 and 500 of the Lidar system 200.

The MOPA 700 includes a highly reflective DBR back mirror 702 located at a back facet 710b and a less reflective DBR front mirror 708 near the front facet 710a. A phase section 704 and a gain section 706 are located between the back mirror 702 and the front mirror 708. The phase section 704 adjusts the modes of the laser and the gain section 706 includes a gain medium for generating light at a selected wavelength. The light exiting the front mirror 708 passes through an amplifier section 710 that increases light intensity.

In various embodiments, the laser has a front facet output power of 300 milliWatts (mW) and has a back facet output power of about 3 mW, while maintaining a linewidth of less than about 100 kilohertz (kHz). The MOPA 700, while having a more complicated design than the DBR Laser Diode 600, is often more dependable in producing the required optical power at the front facet while maintaining single-frequency operation and single-spatial mode operation.

Figure 8:
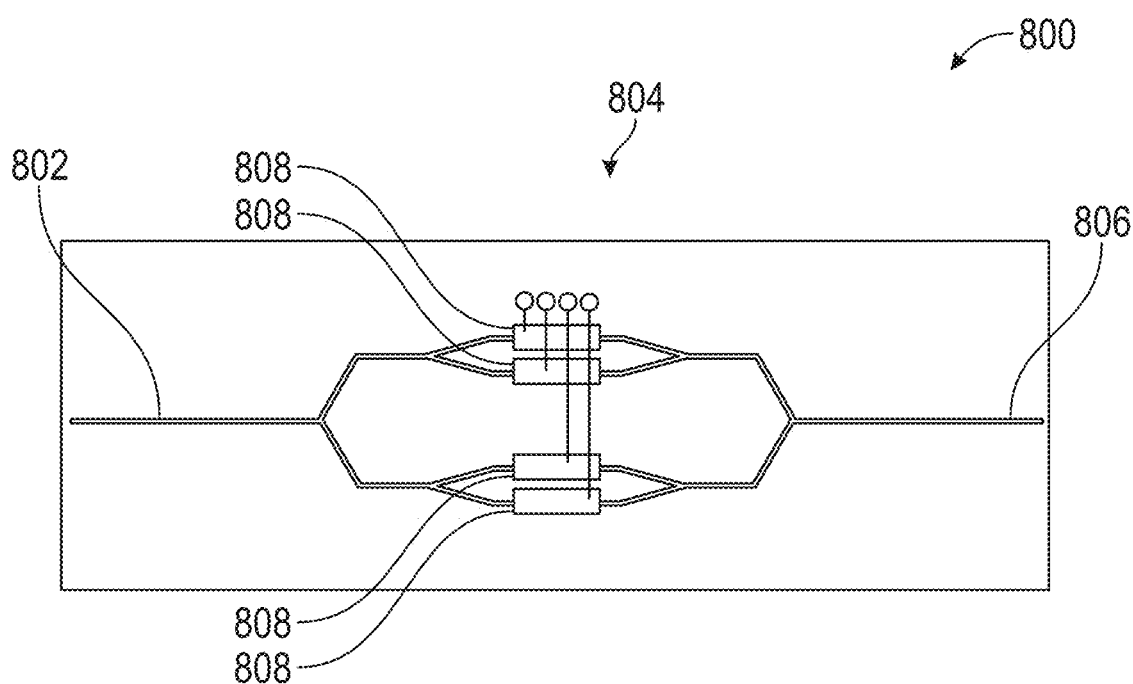
FIG. 8 shows an optical frequency shifter using an Integrated Dual I&Q Mach-Zehnder Modulator (MZM)

FIG. 8 shows an optical frequency shifter 800 using an Integrated Dual I&Q Mach-Zehnder Modulator (MZM) 804. The optical frequency shifter 800 can be used to alter a frequency or wavelength of a local oscillator beam in order to reduce ambiguity in measurements of the reflected light beam 104. The optical frequency shifter 800 includes an input waveguide 802 providing light at a first wavelength/frequency, also referred to herein as a diode wavelength/frequency ($\lambda_D/f_D$) to the MZM 804. The optical frequency shifter 800 further includes an output waveguide 806 that receives light at a shifted wavelength/frequency ($\lambda_D-\lambda_m/f_D+f_m$), from the MZM 804. The $\lambda_m$ and $f_m$ are the wavelength shift and frequency shift, respectively, imparted to the light by the MZM 804.

At the MZM 804, the light from the input waveguide 802 is split into several branches. In various embodiments, there are four branches to the MZM 804. Each branch includes an optical path shifter 808 that can be used to increase or decrease the length of the optical path and hence change the phase delay along the selected branch. A selected optical path shifter 808 can be a heating element that heats the branch in order to increase or decrease the length of the branch due to thermal expansion or contraction. A voltage can be applied to control the optical path shifter 808 and therefore to control the increase of decrease of the length of the optical path. Thus, an operator or processor can control the value of the change in wavelength/frequency ($\lambda_m/f_m$) and thus the shifted wavelength/frequency ($\lambda_D-\lambda_m/f_D+f_m$) in the output waveguide 806.

Figure 9:
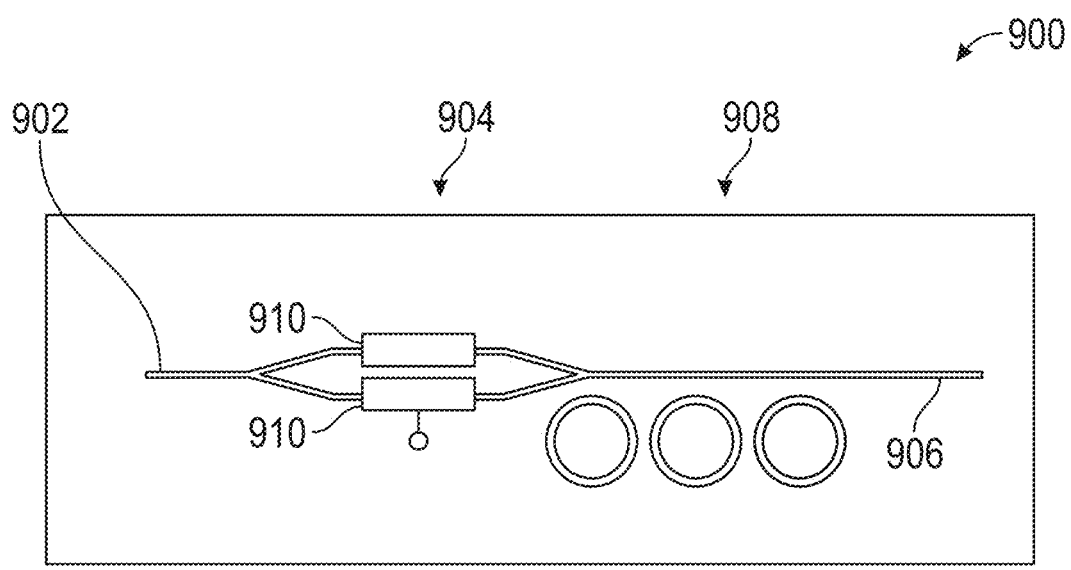
FIG. 9 shows an optical frequency shifter in an alternate embodiment.

FIG. 9 shows an optical frequency shifter 900 in an alternate embodiment. The optical frequency shifter 900 includes a single Mach-Zehnder Modulator (MZM) 904 and a High-Q Ring Resonator Optical Filter 908. The single MZM 904 has two branches of waveguides, each branch having an optical path shifter 910. An input waveguide 902 directs light into the single MZM 904 with an operating wavelength/frequency ($\lambda_D/f_D$), where the light is split among the branches of the single MZM 904. The optical path shifters 910 are activated to impart a change in frequency/wavelength ($\lambda_m/f_m$) to the light. Light from the MZM 904 passes through the optical filter 908 via output waveguide 906 in order to reduce harmonics generated by the single MZM 904. In various embodiments, light exiting via the optical filter 908 has wavelength/frequency ($\lambda_D-\lambda_m/f_D+f_m$).

In various embodiments, the optical frequency shifter (800, 900) shifts the optical frequency of the local oscillator beam by up to about 115 Megahertz (Mhz). The Integrated Dual I&Q MZM 804 is able to achieve a wide range of optical shifting, such as by an amount greater than 1 Gigahertz (GHz) while generating only a low level of harmonics (i.e., <−20 dB). Often, the Integrated Dual I&Q MZM 804 is selected over the Integrated Single MZM and High-Q Ring Resonator Optical Filter 908, although its design is more complex.

Figure 10:
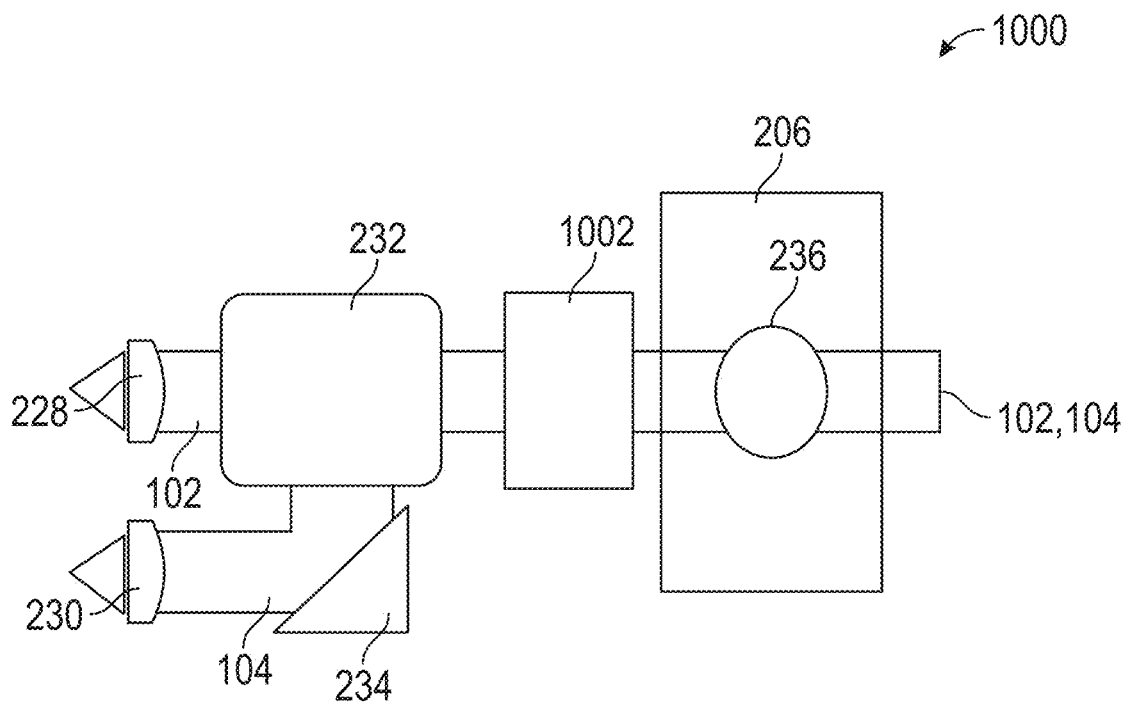
FIG. 10 shows an alternate configuration of free space optics and MEMS scanner for use with the Lidar system of FIG. 2.

FIG. 10 shows an alternate configuration 1000 of free space optics 204 and MEMS scanner 206 for use with the Lidar system 200, FIG. 2. The free space optics includes the collimating lens 228, focusing lens 230, optical circulator 232 and turning mirror 234 as shown in FIG. 2. The free space optics further includes a turning mirror 1002 that directs the transmitted light beam 102 from the optical circulator 232 onto the mirror 236 of the MEMS scanner 206 and directs the reflected light beam 104 from the mirror 236 of the MEMS scanner 206 to the optical circulator 232. The turning mirror can deflect the light out of the plane of the free space optics and can include a plurality of turning mirrors in various embodiments.

Figure 11:
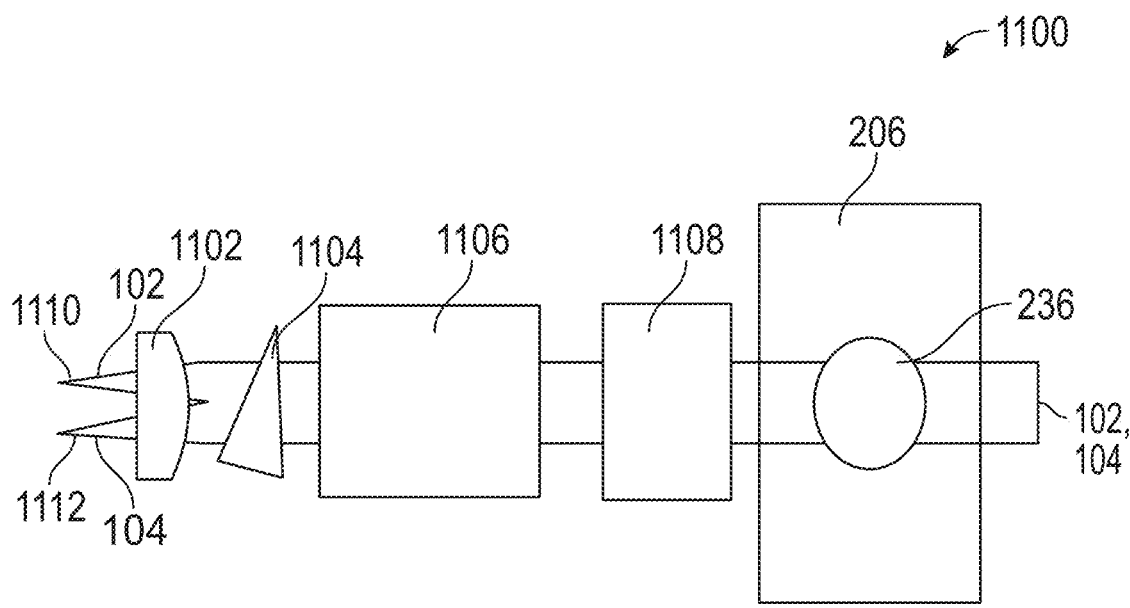
FIG. 11 shows an alternate configuration of free space optics and MEMS scanner for use with the Lidar system of FIG. 2.

FIG. 11 shows an alternate configuration 1100 of free space optics 204 and MEMS scanner 206 for use with the Lidar system 200, FIG. 2. The free space optics includes a single collimating and focusing lens 1102, a birefringent wedge 1104, a Faraday rotator 1106 and a turning mirror 1108. The collimating and focusing lens 1102 collimates the transmitted light beam 102 traveling in one direction and focuses the reflected light beam 104 traveling in the opposite direction. The birefringent wedge 1104 alters a path of a light beam depending on a polarization direction of the light beam. The Faraday rotator 1106 affects the polarization directions of the light beams. Due to the configuration of the birefringent wedge 1104 and the Faraday rotator 1106, the transmitted light beam 102 is incident on the birefringent wedge 1104 with a first polarization direction and the reflected light beam 104 is incident on the birefringent wedge 1104 with a second polarization direction that is different from the first polarization direction, generally by a 90 degree rotation of the first polarization direction. Thus the transmitted light beam 102 can exit the photonic chip at a first aperture 1110 and be deviated to travel along selected direction at mirror 236 of MEMS scanner 206. Meanwhile the reflected light beam 104, travelling in the opposite direction as the transmitted light beam 102 at the MEMS scanner 206, is deviated onto another direction that is directed towards a second aperture 1112 of the photonic chip.

A turning mirror 1108 directs the transmitted light beam 102 from the Faraday rotator 1106 onto the mirror 236 of the MEMS scanner 206 and directs the reflected light beam 104 from the mirror 236 of the MEMS scanner 206 to the Faraday rotator 1106. The turning mirror 1008 can deflect the light out of the plane of the free space optics and can include a plurality of turning mirrors in various embodiments.

Figure 12:
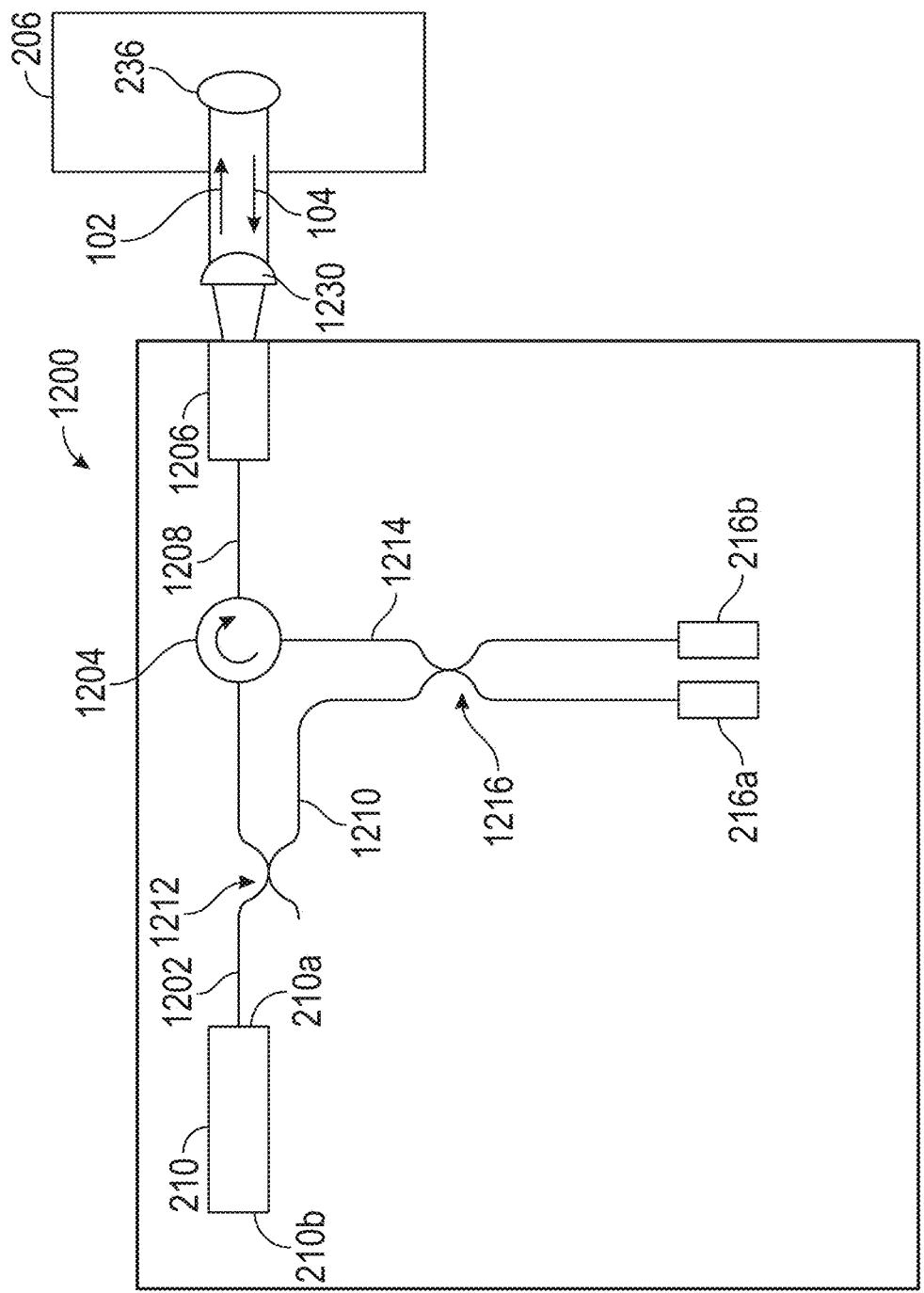
FIG. 12 shows an alternative photonic chip that can be used in a Lidar system.

FIG. 12 shows an alternative photonic chip 1200 that can be used in a Lidar system 200. In various embodiments, the photonic chip 1200 is part of a scanning frequency modulated continuous wave (FMCW) Lidar and can be a silicon photonic chip. The photonic chip 1200 includes a coherent light source such as a laser 210 that is an integrated component of the photonic chip 1200. The laser 210 can be any single frequency laser that can be frequency modulated. In various embodiments, the laser 210 generates light at a selected wavelength, such as a wavelength considered safe to human eyes (e.g., 1550 nanometers (nm)). The laser includes a front facet 210a out of which a majority of the laser energy exits from the laser 210 and a back facet 210b out of which a leakage energy exits. The front facet 210a of laser 210 is coupled to a transmitter waveguide 1202 via a laser-faced edge coupler (not shown) that receives the light from the laser 210. The transmitter waveguide 1202 directs the light from the front facet 210a of the laser 210 to a circulator 1204 integrated into the photonic chip 1200. The circulator 1204 directs the light from the front facet 210a of the laser 210 to an aperture 1206 via an input/output waveguide 1208. The light exits the aperture as transmitted light beam 102.

A local oscillator (LO) waveguide 1210 is optically coupled to the transmitter waveguide 1202 via a directional coupler/splitter or a multi-mode interference (MMI) coupler/splitter 1212 located between the laser 210 and the circulator 1204. The directional or MMI coupler/splitter 1212 splits the light from the laser 210 into the transmitted light beam 102 that continues to propagate in the transmitter waveguide 1202 and a local oscillator beam that propagates in the local oscillator waveguide 1210. In various embodiments, a splitting ratio can be 90% for the transmitted light beam 102 and 10% for the local oscillator beam. The power of a local oscillator beam in the local oscillator waveguide 1210 can be controlled by use of a variable attenuator in the LO waveguide 1210 or by use of a control voltage at the laser 210. The local oscillator beam is directed toward dual-balanced photodetectors 216a, 216b that perform beam measurements and convert the light signals to electrical signals for processing.

Incoming or reflected light beam 104 enters the photonic chip 1200 via the aperture 1206 and input/output waveguide 1208. The input/output waveguide 1208 directs the reflected light beam 104 from the aperture 1206 to the circulator 1204. The circulator 1204 directs the reflected light beam into a receiver waveguide 1214. The receiver waveguide 1214 is optically coupled to the local oscillator waveguide 1210 at a directional or MMI coupler/combiner 1216 located between the circulator 1204 and the photodetectors 216a, 216b. The local oscillator beam and the reflected light beam 104 interact with each other at the directional or MMI coupler/combiner 1216 before being received at the dual-balanced photodetector 216a, 216b. In various embodiments, the transmitter waveguide 1202, local oscillator waveguide 1210 and receiver waveguide 1214 are optical fibers.

FIG. 12 further shows free space optics that can be used with the photonic chip 1200. The free space optics includes a single lens 1230. The transmitted light beam 102 and the reflected light beam both pass through the lens 1230. The lens 1230 is located at a distance from aperture 1206 so that the lens 1230 is a collimating lens for the transmitted light beam 102 emanating from the aperture 1206 and is a focusing lens that focuses the reflected light beam 104 onto the aperture 1206.

The transmitted light beam 102 is passes through the lens 1230 and onto the mirror 236 of the MEMS scanner 206, which directs the transmitted light beam 102 along a selected direction. The reflected light beam 104, being received from the selected direction, is directed form the mirror 236 of the MEMS scanner 206 through the lens 1230 and through aperture 1206. The use of the circulator 1204 within the photonic chip 1200 enables the use of the single lens 1230 between the photonic chip 1200 and the MEMS scanner 206, rather than a plurality of lenses and other free space optics. The use of a single lens 1230 further reduces the number of alignment issues between photonic chip 1200 and MEMS scanner 206.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A method of detecting an object, comprising:
directing a transmitted light beam generated within a laser to a circulator integrated into the photonic chip;
directing the transmitted light beam from the circulator to an aperture of the photonic chip;

receiving a reflected light beam at the aperture, the reflected light beam being a reflection of the transmitted light beam from the object;

directing the reflected light beam from the aperture to the circulator;

directing the reflected light beam from the circulator to one or more photodetectors via a receiver waveguide; and detecting a parameter of the object from the reflected light beam at the one or more photodetectors.

2. The method of claim 1, further comprising generating the transmitted light beam via the laser of the photonic chip.

3. The method of claim 1, further comprising passing the transmitted light beam and the reflected light beam through a single lens in free space.

4. The method of claim 1, further comprising directing the transmitted light beam from the aperture towards a selected direction via a microelectromechanical (MEMS) scanner and directing the reflected light beam received from the selected direction toward the aperture.

5. The method of claim 1, further comprising obtaining a local oscillator beam from the transmitted beam via a splitter between the laser and the circulator.

6. The method of claim 5, further comprising combining the local oscillator beam with the reflected light beam at a location between the circulator and the one or more photodetectors.

7. The method of claim 1, further comprising navigating a vehicle with respect to the object based on the parameter of the object.

8. A Lidar system, comprising:
a photonic chip for measuring a parameter of an object, the photonic chip including:
a laser for generating a transmitted light beam;
an aperture by which the transmitted light beam exits the photonic chip and by which a reflected light beam enters the photonic chip, the reflected light beam being a reflection of the transmitted light beam from the object;
one or more photodetectors configured to measure the parameter of the object from at least the reflected light beam; and
a circulator integrated into the photonic chip, the circulator configured to direct the transmitted light beam toward the aperture and to direct the reflected light beam from the aperture to the one or more photodetectors; and
a receiver waveguide for directing the reflected light beam from the circulator to the one or more photodetectors.

9. The Lidar system of claim 8, further comprising a laser integrated into the photonic chip, the laser generating the transmitted light beam.

10. The Lidar system of claim 8, further comprising a single lens in free space in front of the aperture and through which the transmitted light beam and the reflected light beam pass.

11. The Lidar system of claim 8, further comprising a microelectromechanical (MEMS) scanner configured to direct the transmitted light beam from the aperture towards a selected direction via and direct the reflected light beam received from the selected direction toward the aperture.

12. The Lidar system of claim 9, further comprising a splitter between the laser and the circulator for obtaining a local oscillator beam from the transmitted light beam.

13. The Lidar system of claim 12, further comprising a combiner between the circulator and the one or more photodetectors for combining the local oscillator beam with the reflected light beam.

14. The Lidar system of claim 8, wherein the Lidar system is associated with a vehicle, further comprising a navigation system configured to navigate the vehicle with respect to the object based on the parameter of the object.

15. A vehicle, comprising:
a Lidar system for measuring a parameter of an object, the Lidar system including a photonic chip including:
a laser for generating a transmitted light beam;
an aperture by which a transmitted light beam generated within the photonic chip exits the photonic chip and by which a reflected light beam enters the photonic chip, the reflected light beam being a reflection of the transmitted light beam from the object;
one or more photodetectors configured to measure the parameter of the object from at least the reflected light beam;
a circulator integrated into the photonic chip, the circulator configured to direct the transmitted light beam toward the aperture and to direct the reflected light beam from the aperture to the one or more photodetectors;
a receiver waveguide for directing the reflected light beam from the circulator to the one or more photodetectors; and
a navigation system configured to navigate the vehicle with respect to the object based on the parameter of the object.

16. The vehicle of claim 15, wherein the Lidar system further comprises a laser integrated into the photonic chip, the laser generating the transmitted light beam.

17. The vehicle of claim 15, wherein the Lidar system further comprises a single lens in free space in front of the aperture and through which the transmitted light beam and the reflected light beam pass.

18. The vehicle of claim 15, wherein the Lidar system further comprises a microelectromechanical (MEMS) scanner configured to direct the transmitted light beam from the aperture towards a selected direction via and direct the reflected light beam received from the selected direction toward the aperture.

19. The vehicle of claim 16, wherein the photonic chip further comprises a splitter between the laser and the circulator for obtaining a local oscillator beam from the transmitted light beam.

20. The vehicle of claim 19, wherein the photonic chip further comprises a combiner between the circulator and the one or more photodetectors for combining the local oscillator beam with the reflected light beam.

* * * * *